Nov. 12, 1940.　　T. JOHNSON ET AL　　2,221,639
POWER DRIVING MEANS
Filed Nov. 9, 1938　　2 Sheets-Sheet 1
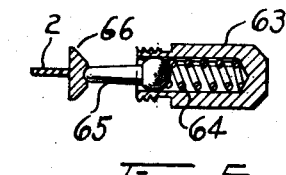
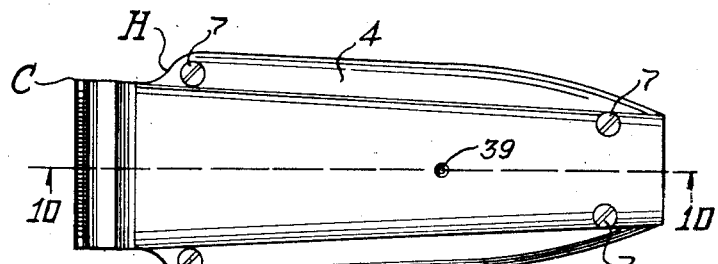
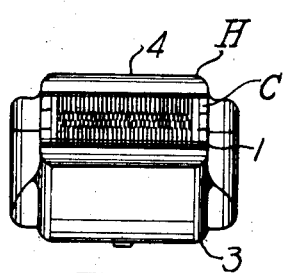
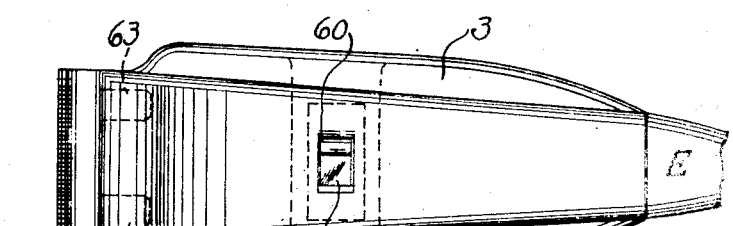
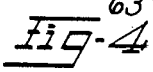
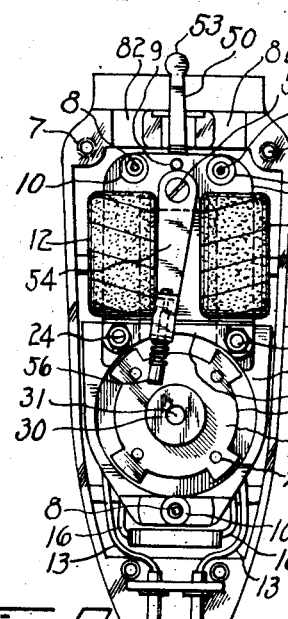
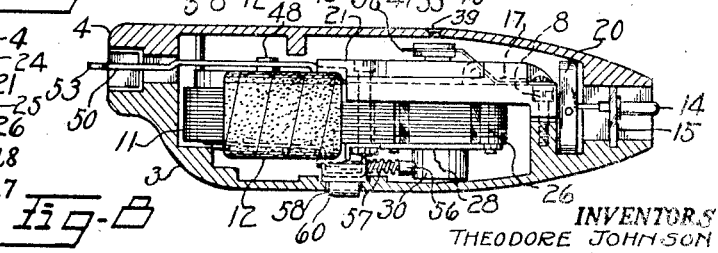
INVENTORS
THEODORE JOHNSON
ARTHUR W. SEYFRIED
ROBERT O. JOHNSON
BY Edmund J. De Pas
ATTORNEY

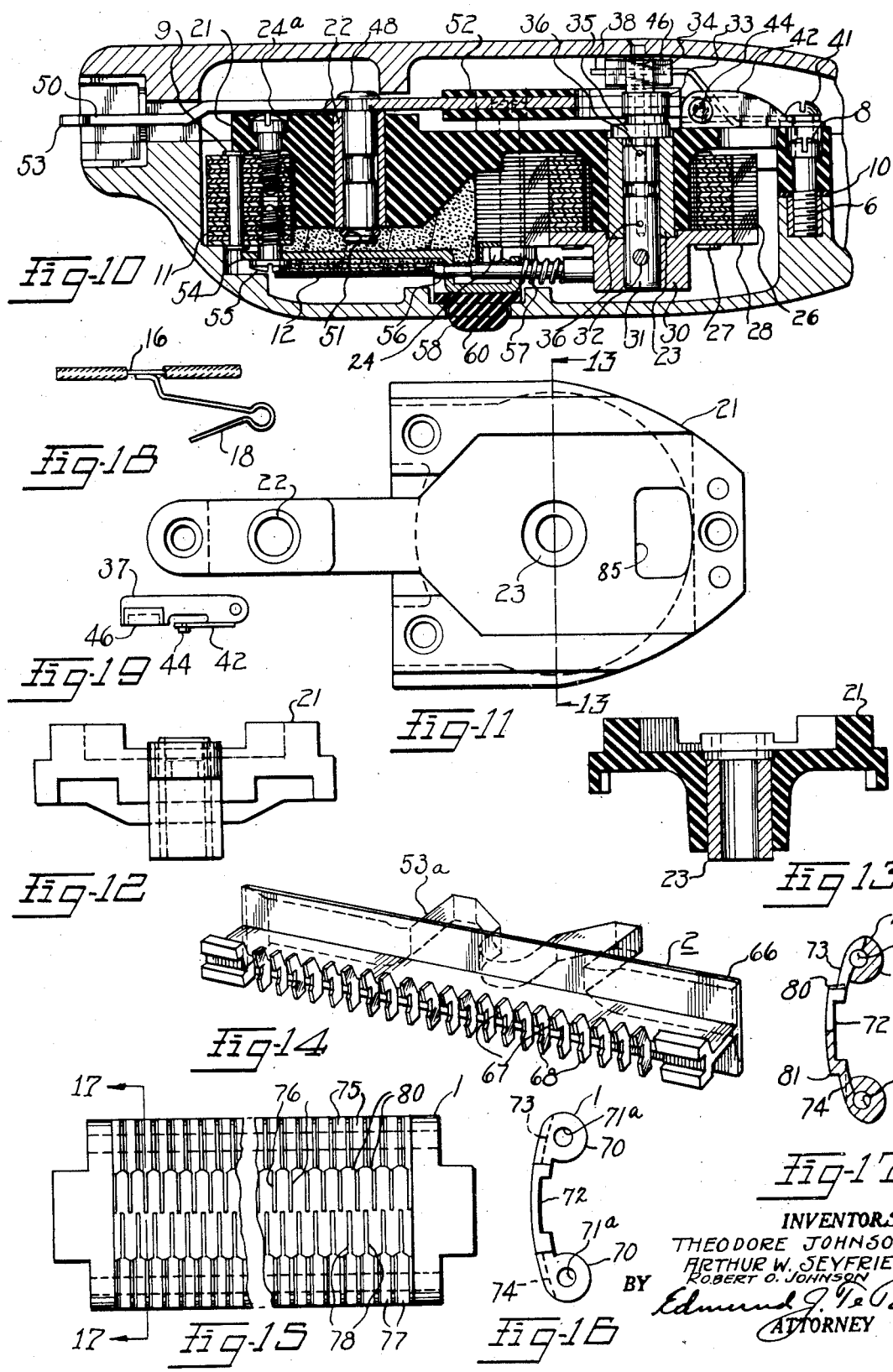

Patented Nov. 12, 1940

2,221,639

UNITED STATES PATENT OFFICE 2,221,639

POWER DRIVING MEANS

Theodore Johnson and Robert O. Johnson, Erie, Pa., and Arthur W. Seyfried, Racine, Wis.

Application November 9, 1938, Serial No. 239,634

10 Claims. (Cl. 172—36)

This invention relates to an electrically-operated, hair-cutting device and more particularly to that type of device which is commonly referred to as a dry shaver.

The invention has for its objects the provision of a hair-cutting device employing an improved type motor for driving the device, the motor improvements including the use of a four-pole armature in combination with a two-pole field, the provision of a stator construction which permits the use of pre-wound stator coils, the locating of such coils closely adjacent to the stator pole faces, the use of a single frame plate for carrying all of the operating parts of the motor and the driving mechanism of the device, the provision of a single elongated bearing for the mounting of the armature shaft of the motor, the provision of an improved form of circuit breaker, the provision of novel means for insuring proper lubrication of the motor and operating parts of the device, the provision of an improved mechanical starter for the motor and the provision of an improved, air-circulating means for cooling the motor.

A further object of the invention relates to the provision of a compact, generally simplified and relatively inexpensive mechanism for carrying out the aforesaid objects.

These and other objects of the invention will become more apparent and better understood after consideration has been given to the following detailed description of the invention, taken in connection with the drawings which show, merely by way of illustration, structure adapted for carrying out the objects of the invention.

In the drawings:

Figure 1 is an end view of a hair-cutting device illustrative of one embodiment of the invention;

Figure 2 is a plan view of one side of the device;

Figure 3 is a side elevational view of the device;

Figure 4 is a plan view of the side of the device opposite to that shown in Figure 2;

Figure 5 is an enlarged, detail sectional view of one of the spring-pressed means which is used to resiliently urge the cutter against the cooperating guard member of the shaver;

Figure 6 is an enlarged perspective view showing the details of one of the elements of the manually-operable starting device for the motor;

Figure 7 is a view corresponding to Figure 2 with the handle cover part and cutter head removed from the device;

Figure 8 is a view corresponding to Figure 3 with the handle or outer casing of the device sectioned along a central longitudinal line;

Figure 9 is a view corresponding to Figure 4 and in which the handle body part and cutter head have been removed from the device;

Figure 10 is an enlarged central sectional view taken on line 10—10 Figure 2 showing the details of the motor and some of the other operating parts of the device;

Figure 11 is an enlarged plan view of the motor frame plate;

Figure 12 is an end view of the plate shown in Figure 11;

Figure 13 is a sectional view of the frame plate taken on line 13—13 of Figure 11;

Figure 14 is an enlarged perspective view of the movable cutter of the device;

Figure 15 is an enlarged plan view of the face plate of the cutter head;

Figure 16 is an end view of the face plate shown in Figure 15;

Figure 17 is a sectional view of the face plate taken on line 17—17 of Figure 15;

Figure 18 is an enlarged detail view of one of the springs for the circuit breaker; and Figure 19 is an enlarged detail view of one of the contact members of the circuit breaker.

The shaving machine illustrated in the drawings comprises a cutter head referred to generally by the letter C and a hollow handle structure referred to generally by the letter H. Power means including a suitable electric motor is located inside the handle H for operating the cutter head, and an electric cord (not shown) and its connector plug E are used to connect the motor to a source of electric current supply as is customary in devices of the type to which this invention relates.

The cutter head which will be described in greater detail later herein comprises a slotted face plate 1 and a reciprocating cutter 2 having cutter teeth in contact with the underside of the face plate so that when the cutter is reciprocating during the use of the machine, the teeth of the cutter sweep across the slots of the face plate and thus sever any hairs which may project through the slots at the underside of the face plate.

The handle H of the device comprises two sections which may be in the form of a molded plastic, many types of which are available and suitable for this purpose. For convenience, the two individual parts which constitute the handle may be referred to as a body part 3 and a cover part 4. Threaded tubular inserts or sleeves 5 and 6 are positioned in the mold used for forming the body part so that when the body part is molded the threaded sleeves form a substantially integral part of the handle body part. The sleeves 5 are adapted for receiving the screws 7 by means of which the cover 4 is secured to the body of the handle.

The sleeves 6, one of which appears in Figure 10, are adapted to receive screws 8 by means of which a small electric motor is secured in place on the handle. Suitable resilient or sound-deadening washers or gaskets 16, as shown in Figure 9, are interposed between the motor and the body of the cover where the screws 8 are received. These washers may be formed from felt, rubber or any other material which is suitable for the intended purpose.

The motor comprises a U-shaped stator 11 which is made up from a plurality of the similarly-formed laminations or stampings which may be held together by one or more rivets 9. Each of the arms of the stator 11 of the motor is provided with a coil 12 preferably pre-wound and which is adapted to be fitted into position on the stator as one of the initial operations in assembling the motor. The coils and stator form the field structure of the motor and they cooperate to intermittently set up a magnetic field across the ends or faces of the stator in the manner which is well understood in the motor art.

One of the leads 13 of each of the coils 12 is connected respectively to one of a pair of contact terminal members 14 which are rigidly mounted in a dielectric plate 15. The contact members 14 are adapted to be detachably received in the plug E. The other lead 16 of each of the coils is connected respectively to one of a pair of similarly-formed wire springs 17 and 18. A condenser 20 is also connected to the coil leads 16 in parallel relation with respect to the springs 17.

The operating parts of the motor are all carried by a single plate or frame member 21 which is preferably formed from an electrically non-conducting, molded plastic material of the type which is more commonly used in the construction of similar parts of an electric motor, as for example the material "Bakelite." The plate or frame member 21 is molded about a pair of aligned bearings or bushings 22 and 23. These bushings may be of the so-called oil-less type or they may be formed from any other material which is suitable for the intended purpose. The plate or frame member 21 is secured to the stator laminations of the motor by means of a pair of bolts 24 and a screw 24a. The bolts 24 also serve to hold a stator cross-brace 25 in position at the side of the stator opposite to the plate 21.

From the foregoing description, taken in consideration with the drawings, it is evident that the plate 21 and the stator laminations are securely held together by means of the bolts 24 and the screw 24a and also that the assembled motor is fixedly secured in the body 3 of the handle by means of the screws 8 which provide a three-point mounting for the motor. Two of the screws 8 are located closely adjacent to each other and extend through the laminations of the stator and assist in holding the stator laminations in place. The third screw 8 traverses the plate or frame member 21 at a point remote from the screws which extend through the stator laminations and in this manner the motor is secured at its extremities to the handle of the device.

The bearing or bushing 23 and the "Bakelite" sleeve surrounding the same are adapted to be received within the hollowed-out, annular, central portion of a four-pole, laminated rotor structure 26. The four poles of the rotor are spaced substantially 90 degrees apart as are also the two pole faces of the stator. The stator and rotor are arranged so that during the operation of the motor successive pairs of poles on the rotor form a magnetic path between the ends of the poles of the stator as is well understood in the motor art.

The individual laminations of the rotor are held together by means of a plurality of rivets 27. These rivets also secure a plate 28 to one side of the rotor. This plate is provided with an axially extending boss 30 which is centrally apertured for receiving an armature shaft 31. The armature shaft 31 is secured at one end in the boss of the plate by means of a pin 32. At its opposite end the shaft 31 is provided with an eccentric 33 and a four-sided cam 34. A shoulder or flange 35 formed on the shaft beneath the eccentric 33 constitutes a thrust bearing for the shaft which contacts with one of the end faces of the armature bearing 23. The other end of the bearing 23 is engaged by the inner face of the plate 28. The pin 32 thus serves to hold the armature and its shaft in place in the motor and it also serves to lock the armature 26 and cam 34 in proper position with respect to each other.

The armature shaft 31 is centrally bored and the hollow interior of the shaft communicates with the exterior thereof and supplies lubricant to the bearing 23 by means of small radially drilled oil holes 36. A piece of felt or any other suitable material may be fitted within the bore of the shaft 31 to absorb and hold a supply of oil inside the shaft for lubricating its bearing. Oil is supplied to the shaft through a hole 39 in the cover part 4.

A pair of similarly-formed sheet metal contact blades 37 and 38 are pivotally mounted at one end on the frame member 21 by means of screws 40 and 41, respectively. A portion at one edge of each of the blades is bent up normal to the plane of the rest of the blade to form a resilient, contact-carrying arm. The contact arms of the blades 37 and 38 are numbered 42 and 43, respectively. The screws 40 and 41 also serve to hold the contact springs 17 and 18, respectively, in place so that one of the end portions of each of these springs engages with a side wall of the frame member or plate 21 and the opposite ends of each of the springs engage with the arms 42 and 43 of the respective contact blades. The springs 17 and 18 when occupying the position shown in the drawings are in a compressed condition and tend to urge the contact blades 37 and 38 towards each other.

The spring arms 42 and 43 are provided at their ends with contact points 44 and 45, respectively. The contact blades 37 and 38 are each fitted with an oil-absorbing, phenol impregnated fiber bearing block 46 and 47, respectively, adapted to be contacted by the cam 34 so that during the rotation of the motor, this cam separates the contact points 44 and 45 four times for each revolution of the armature and in this manner current is supplied to the coils 12 at the proper times to cause the rotation of the motor armature. The condenser 20 is provided for the purpose of reducing arcing at the contact points and for improving the operating characteristics of the motor.

The bearing or bushing 22 of the plate or frame member 21 is adapted to receive the bearing pin 48 of an oscillating lever 50. The pin 48 is held in place in the bearing by means of a spring washer or ring 51. The lever 50 has a forked end about which is molded an insulating and bearing material 52 as for example "Bakelite," which is adapted to straddle and engage the eccentric 33 of the armature shaft. At its other end the oscillating lever 50 is provided with a rounded end 53 for reciprocating the cutter 2. The end 53 of the lever is received in a bifurcated tongue 53a of the cutter 2.

Motors of the type disclosed herein are not ordinarily self-starting and special means in the form of a kick starter is provided to start the motor. In this connection it might be noted that due to the four-pole construction of the motor, its starting is more easily effected than is the case with a two-pole or a three-pole motor because of the greater number of impulses imparted to the armature for each revolution and it very frequently happens that the motor starts itself when connected to a source of electrical current. The starter comprises a starter lever 54 which is pivotally attached to the stator laminations by means of a screw 55. The lever has an offset part at one end where a pair of aligned holes are provided for receiving a plunger pin 56 which is adapted to be swung into contact engagement with the reduced end section or boss 30 of the armature end plate 28. One end of the pin 56 is provided with an annularly reduced section and the metal of the lever 54 is compressed to constrict the hole in which this end of the pin is received so as to hold the pin in place in the lever for limited axial movement. The other end of the pin 56 has an enlarged head and a spring 57 is compressed between the head of the pin and the inturned end of the lever 54 for the purpose of maintaining proper contact between the pin and the boss 30 of the armature when the starter is operated.

The body part 3 of the handle is provided with a suitable slot and guide-way for receiving a manually-operable starter shifter 58. This member has a tongue 60 which projects for a slight distance through the slot in the handle body 3 where it may be engaged by the finger of the user. At its opposite side the shifter 58 is accurately slotted at 61 to receive the offset end of the lever 54. When the terminals 14 of the motor are connected to a source of electric current, the armature may be rotated a slight amount by simply shifting the member 58 in one direction or the other and this will serve to open and close the contacts of the motor at least once and thus cause the armature to start to rotate.

The cutter head of the device comprises a channel-shaped frame member 62 which may be formed from brass or any other suitable material. This member has a longitudinal slot in its base for guiding the tongue 53a of the cutter 2 and the base is apertured midway between its ends for receiving the end 53 of the oscillating lever 50. Threaded holes are provided in the base of the member 62 for receiving a pair of similarly-formed threaded studs 63. The studs 63 are each axially bored to provide a housing for a spring 64 which engages with the rounded end of a bearing pin 65 and urges the opposite end of the pin into contact with the under side of the cutter 2 whereat a suitable indentation is provided for receiving the end of the bearing pin. The cutter 2 is provided with a cross-piece 66 which also assists in guiding the cutter in its movement in the channel-shaped cutter head frame member 62.

Two series of angularly disposed blades or teeth 67 and 68 are formed at the top of the cutter 2. These teeth contact with the under side of the slotted face plate 1. The angular arrangement of the cutter teeth 67 and 68 not only facilitates the shearing of the hair but it also provides a better bearing contact at the underside of the slotted shear plate for the relatively narrow teeth which are used in this cutter.

The face plate 1 may be constructed in the form of a steel stamping employing a quality of steel suitable for this purpose. The face plate is first blanked and then formed with its opposite edges curled over at 70 to reinforce the plate and provide a passageway 71a for receiving an elongated pin 71 at each side of the face plate by means of which the face plate is secured in place on the member 62. After the forming operation, the underside of the face plate is channeled at 72 and the topside of the face plate is cut down at 73 and 74. The wide portions 75 and 77 and the narrow portions 76 and 78 of the slots of the face plate may then be cut.

The wide and narrow portions of the slots connect with each other at a point adjacent to the shoulders which are formed by milling the top face of the face plate at 73 and 74. These shoulders are indicated by the numerals 80 and 81 in Figure 17. In this manner the relatively wide cutter bars which define the narrow slots 76 and 78 terminate in narrow offset ends which serve to guide the hairs into the narrow portions of the slots and to comb up hairs lying close to the skin and direct the same into the slots.

After the face plate has been machined to the extent indicated it may then be hardened to the degree desired. The channel 72 is then ground down slightly and the plate is attached to the member 62 by the pins 71. The top of the face plate may then be ground down sufficiently so that the midpoint of the face plate is .015 of an inch thick. The wide portions 75 of the slots are preferably .021 of an inch wide and the narrow portions 76 of the slots are preferably .010 of an inch wide. The width of the narrow portions of the slots and the thickness of the cutter bars thereat may be varied slightly from the dimensions mentioned if desired.

The face plate is provided with two series of slots as may be seen from the examination of Figure 15 of the drawings, and the slots of each series are arranged in staggered relation with respect to the slots of the other series so that in moving the face plate back and forth across the skin, the effective area covered by the slots is just double that which would be covered if the slots had been extended completely across the face plate instead of terminating intermediate the width of the plate and being arranged in the staggered relation just described.

The channeled end of the handle H frictionally engages the cutter head C and removably holds the same in place. The handle is also provided with suitable apertures 82 into which the studs 63 are received for centering and locating the cutter head in place on the handle.

The locating of the armature and its shaft at the end of the handle opposite to the cutter head permits the use of a relatively long oscillating lever 50 to drive the shaver cutter. By reason of this construction it is not necessary to swing the lever through a very great arc in order to move the cutter the distance desired and because of this the necessary movement of the rounded end 53 of the lever in the groove of the cutter tongue 53a and the resultant wear at this point is very slight.

The current carrying parts of the motor and the structure adjacent thereto are constructed and arranged so that the motor will be safe in operation and meet with the most rigid electric safety requirements. The electrically non-conducting base plate 21, the electrically non-conducting sheath 52 for the oscillating lever 50 and the electrically non-conducting bearing blocks 46 and 47 contribute greatly to the safety of the device in reducing the possibility of grounding of the motor and the accidental connection of the cutter head in circuit with the current supply.

In the operation of the motor the armature functions as a fan for circulating air inside the handle to cool the motor and its circuit breaker. This result is accomplished by partially enclosing the armature in the manner shown and by providing an opening 85 in the frame plate 21 adjacent to the contact members 42 and 43 and at the periphery of the armature. The armature enclosure acts as a fan case and the opening 85 functions as the fan case discharge outlet and in this manner the temperature of the motor and its operating parts is kept within safe limits by forced air circulation.

In the use of a shaver of the type to which this invention relates, the customary procedure is to grasp the shaver handle as close to the cutter head as is convenient and for this reason it is important to concentrate as much of the weight of the device as close to the cutter head as is possible. In the present construction this result is accomplished by locating the stator and its coils in the handle at the side of the rotor nearest to the cutter head and because of this the weight of the shaver is substantially balanced in the hand of the user when held in the ordinary manner.

The foregoing description and the accompanying drawings to which it relates, describe what might be termed the preferred mode of practicing the invention. It is to be clearly understood, however, that the invention includes each and every novel feature or combination or novel features herein disclosed, subject only to the restrictions of the prior art, and that the invention may assume other forms and it is not to be limited to the particular and specific structure shown and described herein.

Having thus described our invention, what we claim is:

1. A device of the type described, a hollow handle structure, a relatively small, compact and powerful electric motor mounted therein, said motor comprising a stator providing a pair of poles having faces at one of their ends and connected to each other at their other ends, windings for said stator, an armature having four poles spaced substantially ninety degrees from each other, means consisting of a single bearing and a support therefor for rotatably mounting said armature at one end of said stator so that during the operation of the motor successive pairs of poles of the armature are successively presented to the pole faces of the stator, the use of a four-pole armature permitting the employment of a stator of a width comparable to or less than the diameter of the armature, and means for intermittently supplying electric current to said stator windings.

2. In a device of the type described, power driving means comprising an electric motor having a stator, a frame member fixed thereto, a bearing rigid with the frame member, an armature shaft adapted to be mounted in said bearing, an armature carried by said shaft, windings for said stator, contact means for controlling the flow of electric current through said stator windings, cam means on said armature shaft for operating said contact means, and a power take-off including eccentric means on said shaft adjacent to said cam means, said contact means and said armature being located at opposite sides of said frame member, said frame member having an aperture adjacent said contact means for exposing the same to a cooling draft of air generated upon rotation of said armature.

3. In a device of the type described, power driving means comprising, an electric motor having a stator, a frame member fixed thereto, a bearing rigid with the frame member, an armature shaft adapted to be mounted in said bearing, an armature carried by said shaft, windings for said stator, contact means for controlling the flow of electric current through said stator windings, cam means on said armature shaft for operating said contact means, and a power take-off including eccentric means on said shaft adjacent to said cam means, and means including said armature and said frame member for causing a circulation of air inside said handle and directing to said contact means to cool the same.

4. In a device of the type described, the combination with an electric motor having a rotatable armature having an annular section or relatively small diameter, of a mechanical starter therefor comprising a manually-operable, elongated, pivoted lever adapted to be swung through a relatively small arc and having a spring-pressed end adapted to engage said annular section of the armature and rotate the armature sufficiently to start the motor.

5. In a device of the type described, power driving means comprising an electric motor having a stator, a frame member fixed thereto, a bearing rigid with the frame member, an armature shaft adapted to be mounted in said bearing, an armature carried by said shaft, windings for said stator, contact means for controlling the flow of electric current through said stator windings, cam means on said armature shaft for operating said contact means, and a power take-off including eccentric means on said shaft adjacent to said cam means, said cam means and said eccentric means being located at one side of said armature, said armature shaft being hollow and having communicating apertures for conveying lubricant from the interior of the shaft to said bearing and eccentric.

6. In a device of the type described, a handle structure, power driving means inside said handle structure comprising an electric motor having a stator, a frame member fixed thereto, a bearing rigid with the frame member, an armature shaft adapted to be mounted in said bearing, an armature carried by said shaft, windings for said stator, contact means for controlling the flow of electric current through said stator windings, cam means on said armature shaft for operating said contact means, and a power take-off including eccentric means on said shaft adjacent to said cam means, said cam means and said eccentric means being both located at one side of said armature, said armature shaft being hollow and having communicating apertures for conveying lubricant from the interior of the shaft to said bearing, lubricant absorbing and retaining means in the hollow interior of said shaft, said handle structure having an opening in alignment with the open end of said shaft for supplying lubricant thereto.

7. In a device of the class described, in combination, a hollow handle structure, an electric motor mounted in said handle comprising a U-shaped stator, windings for said stator, an armature, a shaft for said armature, a unitary frame member fixed to said handle structure with a centrally disposed bearing formed therein for journalling said armature shaft, contact means for controlling the flow of electric current through said stator windings, cam means on said armature shaft for operating said contact means, and a power take-off including eccentric means on said shaft adjacent said cam means, said power take-off being located at the side of said frame member opposite to said armature.

8. In a device of the class described, a hollow handle structure, a unitary frame for an electric motor fixed thereto, said frame having bearings formed integral therewith along the longitudinal axis thereof, a stator secured to said frame, windings for said stator, an armature, a shaft for said armature mounted in one of the bearings in said frame, contact means for controlling the flow of current through said stator windings, cam means on said armature shaft for operating said contacts, power take-off means mounted in the other bearing in said frame, eccentric means on said shaft for operating said power take-off means, and means for connecting said contact means to a source of electrical current.

9. In a device of the class described, in combination, a hollow handle structure, an electric motor, a unitary frame fixed to said handle structure for mounting said electric motor internally of said handle structure having a pair of spaced aligned bearings, an oscillating lever for imparting oscillating motion journalled in one of the bearings in said frame, a stator, windings for said stator, a motor armature, a shaft for said armature journalled in the other bearing in said frame and having an off-center driving connection with said lever, and means for providing electrical current to said stator windings.

10. A device as set forth in claim 9 wherein said lever and said armature are disposed at opposite sides of the frame.

THEODORE JOHNSON.
ROBERT O. JOHNSON.
ARTHUR W. SEYFRIED.